(12) United States Patent
Soundararajan

(10) Patent No.: US 8,878,996 B2
(45) Date of Patent: Nov. 4, 2014

(54) SELECTIVE DECODING OF AN INPUT STREAM

(75) Inventor: Aravind Soundararajan, Bangalore (IN)

(73) Assignee: Motorola Mobility LLC, Libertyville, IL (US)

(*) Notice: Subject to any disclaimer, the term of this patent is extended or adjusted under 35 U.S.C. 154(b) by 576 days.

(21) Appl. No.: 12/726,437

(22) Filed: Mar. 18, 2010

(65) Prior Publication Data

US 2011/0141362 A1  Jun. 16, 2011

(51) Int. Cl.
| | | |
|---|---|---|
| H04N 5/445 | (2011.01) | |
| H04N 21/431 | (2011.01) | |
| H04N 19/44 | (2014.01) | |
| H04N 19/46 | (2014.01) | |
| H04N 19/172 | (2014.01) | |
| H04N 19/103 | (2014.01) | |

(52) U.S. Cl.
CPC ....... *H04N 5/44504* (2013.01); *H04N 21/4316* (2013.01); *H04N 19/00533* (2013.01); *H04N 19/00545* (2013.01); *H04N 19/00266* (2013.01); *H04N 19/00018* (2013.01)
USPC ...... 348/564; 348/563; 348/565; 375/240.25; 375/240.26

(58) Field of Classification Search
USPC ............... 348/584–600, 553–568, 441–459; 375/240.25, 240.26
See application file for complete search history.

(56) References Cited

U.S. PATENT DOCUMENTS

| | | | | |
|---|---|---|---|---|
| 5,594,507 A | * | 1/1997 | Hoarty | 348/584 |
| 5,847,771 A | * | 12/1998 | Cloutier et al. | 348/564 |
| 6,115,072 A | * | 9/2000 | Vuong et al. | 348/445 |
| 6,256,345 B1 | * | 7/2001 | Cho | 375/240.08 |
| 6,310,657 B1 | * | 10/2001 | Chauvel et al. | 348/569 |
| 6,462,744 B1 | * | 10/2002 | Mochida et al. | 345/543 |
| 6,498,816 B1 | * | 12/2002 | Easwar et al. | 375/240.26 |
| 6,538,658 B1 | * | 3/2003 | Herrera | 345/582 |
| 6,553,150 B1 | * | 4/2003 | Wee et al. | 382/243 |
| 6,567,128 B1 | * | 5/2003 | Webb et al. | 348/584 |
| 6,758,540 B1 | * | 7/2004 | Adolph et al. | 375/240.26 |
| 6,859,557 B1 | | 2/2005 | Uyttendaele et al. | |
| 7,039,113 B2 | | 5/2006 | Soundararajan | |
| 7,194,032 B1 | * | 3/2007 | Easwar et al. | 375/240.12 |
| 7,636,131 B2 | * | 12/2009 | Hsieh et al. | 348/716 |
| 7,982,810 B2 | * | 7/2011 | Ohara | 348/790 |
| 8,115,867 B2 | * | 2/2012 | Miyauchi et al. | 348/452 |
| 2003/0043907 A1 | * | 3/2003 | Nakayama | 375/240.08 |
| 2003/0076885 A1 | * | 4/2003 | Chen et al. | 375/240.16 |
| 2005/0078222 A1 | * | 4/2005 | Liu et al. | 348/700 |
| 2006/0038922 A1 | * | 2/2006 | Hsieh et al. | 348/564 |
| 2006/0203910 A1 | * | 9/2006 | Kitada et al. | 375/240.12 |
| 2006/0285015 A1 | * | 12/2006 | Choi et al. | 348/565 |
| 2007/0132784 A1 | * | 6/2007 | Easwar et al. | 345/629 |
| 2008/0138030 A1 | * | 6/2008 | Bryan et al. | 386/52 |
| 2010/0214485 A1 | * | 8/2010 | Tkachenko | 348/598 |

* cited by examiner

*Primary Examiner* — Jefferey Harold
*Assistant Examiner* — Humam Satti

(57) ABSTRACT

A method of selectively decoding an input stream is provided. In the method, an encoded input stream for display as a plurality of frames in a display window is received. In addition, a location of an overlay on the plurality of frames is determined and the encoded input stream is selective decoded to selectively generate the plurality of frames based upon the location of the overlay on the plurality of frames.

15 Claims, 4 Drawing Sheets

SELECTIVE DECODING OF AN INPUT STREAM

BACKGROUND

Video frames are typically compressed using different algorithms. These different algorithms for video frames are called picture types or frame types, and the three major picture types used in the different video algorithms are I-frames, P-frames and B-frames. I-frames are the least compressible but do not require other video frames to decode. P-frames can use data from previous I-frames to decompress and are more compressible than I-frames. B-frames can use both previous and forward frames for data reference to get the highest amount of data compression.

Set top boxes are typically designed to display multiple layers of images in the video output to display devices, such as, televisions, by providing one or more overlays in a main window. The term overlay may be defined as an image displayed over an image displayed in a main window of a display device. Examples of overlays include an Electronic Program Guide (EPG), closed captioning, Picture-in Picture (PIP), etc. Conventionally, set top boxes fully decode the video images in the main window, including the sections that are covered by overlays. The decoding process typically consumes a great deal of bandwidth and thus reductions in the bandwidth consumption are desirable.

SUMMARY

Disclosed herein is a method of selectively decoding an input stream. In the method, an encoded input stream for display as a plurality of frames in a display window is received. In addition, a location of an overlay on the plurality of frames is determined and the encoded input stream is selectively decoded to selectively generate the plurality of frames based at least upon the location of the overlay on the plurality of frames.

Also disclosed herein is a receiver that includes an input module configured to receive an encoded input stream for display as a plurality of frames in a display window, an overlay location determining module configured to determine a location of an overlay on the plurality of frames, and a decoder configured to selectively decode the encoded input stream to selectively generate the plurality of frames based upon the location of the overlay on the plurality of frames.

Further disclosed is a computer readable storage medium on which is embedded one or more computer programs. The one or more computer programs implement a method for selectively decoding an input stream. The one or more computer programs includes a set of instructions for receiving an encoded input stream for display as a plurality of frames in a display window, determining a location of an overlay on the plurality of frames; and selectively decoding the encoded input stream to selectively generate the plurality of frames based upon the location of the overlay on the plurality of frames.

Through implementation of the method and receiver disclosed herein, the amount of bandwidth required to decode an encoded input stream for display as a plurality of frames in a display window may substantially be reduced when an overlay is provided on the plurality of frames. More particularly, the method and receiver disclosed herein are configured to selectively decode the encoded input stream by decoding only those sections of the plurality of frames that are not covered by the overlay, thus reducing, for instance, the number of macroblocks of the frames to be decoded. The method and receiver disclosed herein may, however, partially decode the encoded input stream when certain conditions pertaining to the overlay and the frames are met.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Figure 1:
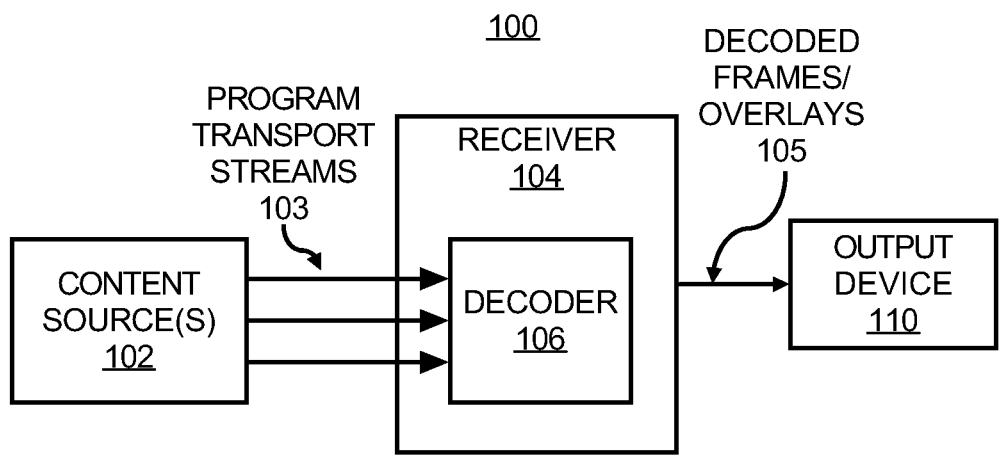
FIG. 1 illustrates a block diagram of a content receiving system, according to an embodiment of the invention.

With reference first to FIG. 1, there is shown a block diagram of a content receiving system 100, according to an embodiment of the present invention. It should be apparent to those of ordinary skill in the art that the block diagram of FIG. 1 represents a generalized illustration and that other components may be added or existing components may be removed, modified or rearranged without departing from a scope of the content receiving system 100.

The content receiving system 100 is depicted as including one or more content sources 102, a receiver 104, and an output device 110. The content source(s) 102 may comprise a direct source of content, such as, a network television broadcast provider, a cable television broadcast provider, etc. The content source(s) 102 may also comprise a cable television provider, a satellite television provider, etc., a head-end of a cable television provider, or the like. In addition, the content may comprise the programming offered by the content source(s) 102 to be broadcast to users. The receiver 104 may include any suitable device capable of receiving and decoding content received from the content source(s) 102, such as, a set-top box, a satellite-TV receiver, a television, a computer, a mobile device, etc. The output device 110 may include any suitable display device, such as, a liquid crystal display monitor, a light emitting diode monitor, a digital light projector monitor, a light projector, etc. Although the output device 110 has been depicted as forming a separate component from the receiver 104, it should be understood that the output device 110 may be integrated with the receiver 104 without departing from a scope of the receiver 104.

In any regard, the content source(s) 102 is configured to communicate program transport streams 103 to the receiver 104, which comprises, for instance, MPEG streams. The program transport streams 103 may include audio and/or video data or information, such as streamed audio services, streamed video services, and streamed data services or files. Thus, for instance, the program transport streams 104 include content to be played and/or recorded on the receiver 104 and displayed on the output device 110.

The content source(s) 102 may include an encoder (not shown) configured to encode the program transport streams 103 prior to communicating the program transport streams 103 to the receiver 104. In addition, or alternatively, however, the content source(s) 102 may receive the program transport streams 103 in encoded format and may simply communicate the encoded program streams 103 to the receiver 104.

The content source(s) 102 are configured to communicate the encoded program transport streams 103 to the receiver 104 through any suitable communication channel. Suitable communication channels include, for instance, communication channels over satellites, land-line based communications, etc. As such, although not explicitly depicted in FIG. 1, additional components may be positioned between the content source(s) 102 and the receiver 104 to enable the communications.

The receiver 104 includes a decoder 106 configured to decode the encoded program transport streams 103 to generate a plurality of frames for display on the output device 110. The receiver 104 may also generate and/or receive overlays to be displayed on the output device 110. In this regard, the receiver 104 is configured to communicate the decoded frames and the overlays 105 to the output device 110 for display on the output device 110.

Figure 2:
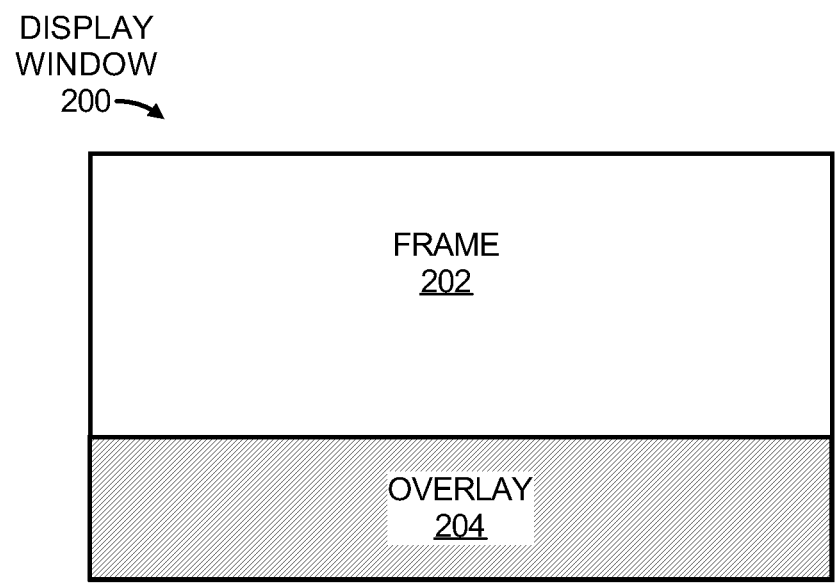
FIG. 2 illustrates a diagram of a display window of the output device depicted in FIG. 1, according to an embodiment of the present invention.

With reference now to FIG. 2, there is shown a diagram of a display window 200 of the output device 110 depicted in FIG. 1, according to an embodiment of the invention. As shown therein, a partial version of a frame 202 may be displayed on the display window 200 with an overlay 204. In other words, part of the frame 202 is depicted as being covered by the overlay 204 and a full version of the frame 202 would be visible if the overlay 204 were removed. By way of example, the overlay 204 may be the same size as the frame 202 and thus, the entire frame 202 may be covered by the overlay 204. The overlay 204 may be positioned in any part of the frame 202, for instance, in the top left corner, top right corner, bottom left corner, bottom right corner, in the center of the frame 202, etc.

The overlay 204 may include various types of graphics that may be displayed over the frame 202, such as a picture-in picture (PIP) window, an electronic program guide (EPG), closed captioning text, logos, etc. In addition, the overlay 204 may be opaque or translucent. As discussed in greater detail herein below, the decoder 106 is configured selectively decode the encoded program transport streams 103 to selectively generate the frame 202 displayed in the display window 200 based upon the existence and location of the overlay 204. The selective decoding may also be based upon the type of the frame 202 as well as whether the overlay 204 is translucent or opaque as also discussed in greater detail herein below.

Figure 3:
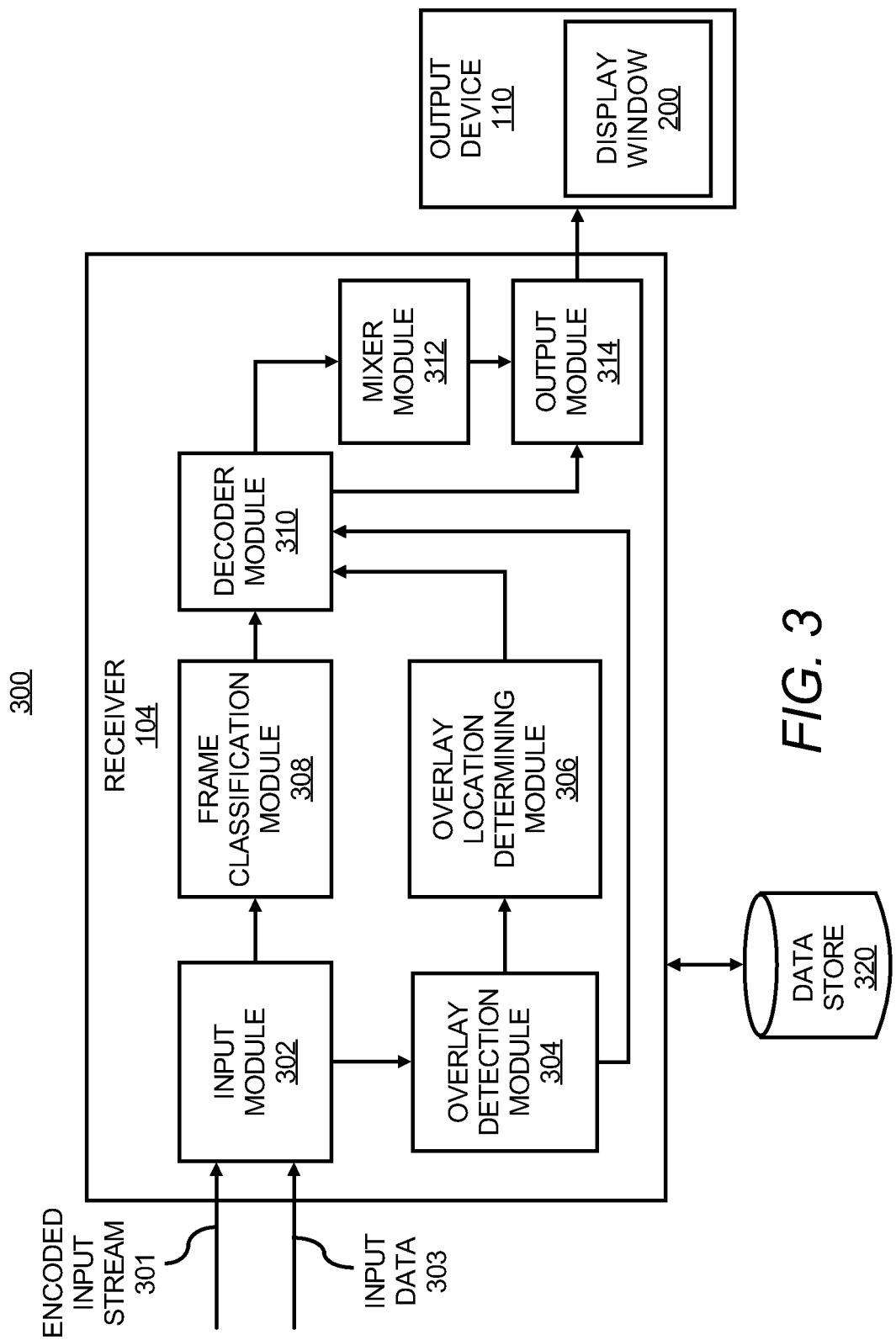
FIG. 3 shows a block diagram of the receiver depicted in FIG. 1, according to an embodiment of the present invention.

With particular reference now to FIG. 3, there is shown a simplified block diagram 300 of the receiver 104 depicted in FIG. 1, according to an embodiment. It should be apparent to those of ordinary skill in the art that the block diagram 300 of the receiver 104 represents a generalized illustration and that other components may be added or existing components may be removed, modified or rearranged without departing from a scope of the receiver 104.

As shown in FIG. 3, the receiver 104 includes an input module 302, an overlay detection module 304, an overlay location determining module 306, a frame classification module 308, a decoder module 310, a mixer module 312, and an output module 314. The modules 302-314 may comprise software modules, hardware modules, or a combination of software and hardware modules. Thus, in one embodiment, one or more of the modules 302-314 comprise circuit components. In another embodiment, one or more of the modules 302-314 comprise software code stored on a computer readable storage medium, which is executable by a processor.

The receiver 104 may also be in communication with a data store 320, which may comprise any reasonably suitable memory upon which the analyzer 104 may store data and from which the receiver 104 may retrieve data. Although the data store 320 has been depicted as forming a separate component from the receiver 104, it should be understood that the data store 320 may be integrated with the receiver 104 without departing from a scope of the receiver 104.

Figure 4:
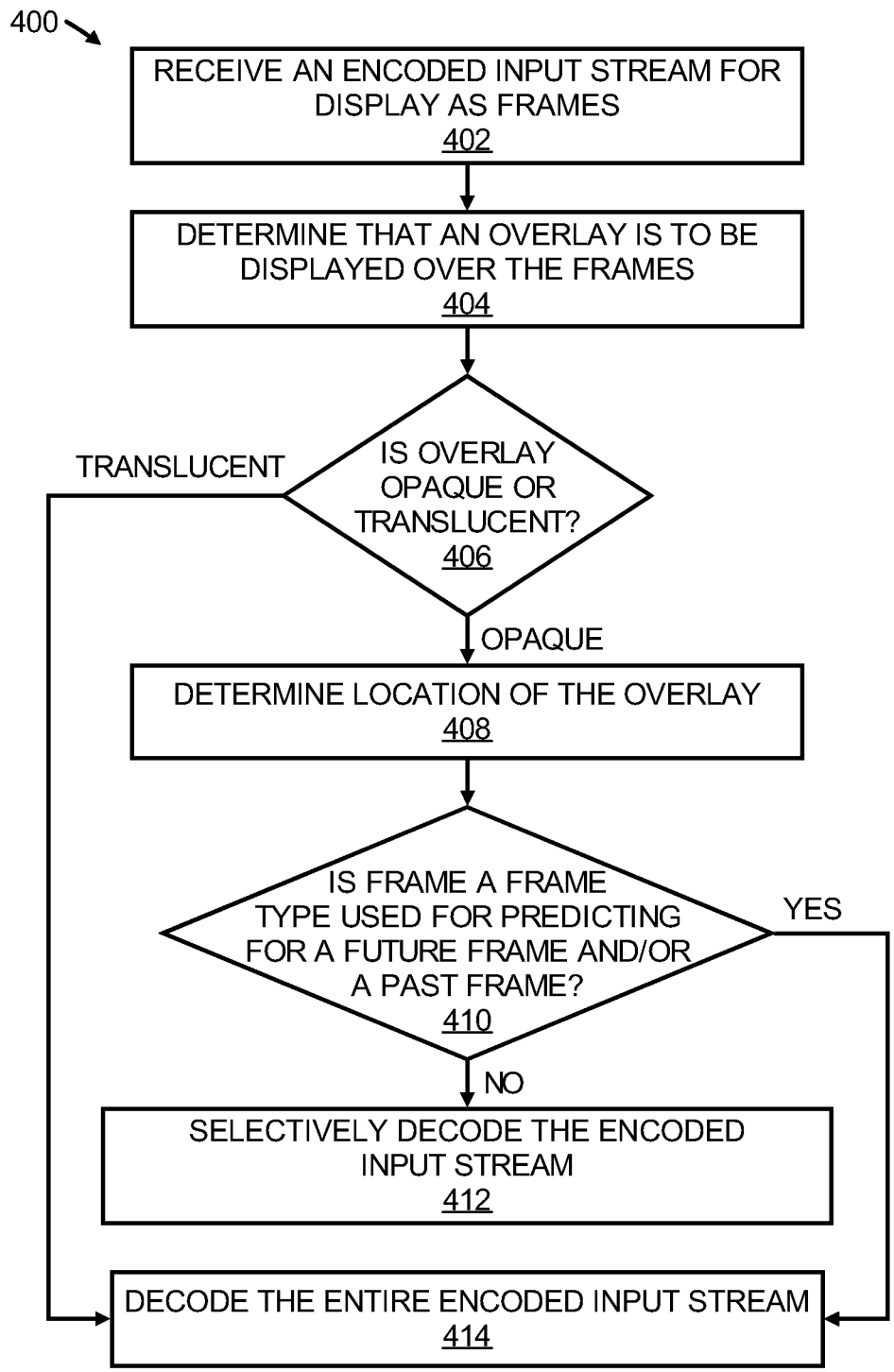
FIG. 4 illustrates a flow diagram of a method for selectively decoding an input stream, according to an embodiment of the present invention.

Various manners in which the modules 302-314 of the receiver 104 may be implemented are described in greater detail with respect to FIG. 4, which depicts a flow diagram of a method 400 for selectively decoding an input stream, according to an embodiment. It should be apparent to those of ordinary skill in the art that the method 400 represents a generalized illustration and that other steps may be added or existing steps may be removed, modified or rearranged without departing from a scope of the method 400.

The description of the method 400 is made with particular reference to the receiver 104 depicted in FIGS. 1 and 3 and thus makes particular reference to the elements contained in the receiver 104. It should however, be understood that the method 400 may be implemented in an apparatus that differs from the receiver 104 without departing from a scope of the method 400.

As shown therein, at step 402, an encoded input stream 301 is received, for instance, through the input module 302. As discussed above, the encoded input stream 301 may be received from the content source(s) 102 and may include video data to be displayed on the output device 110. The encoded input stream 301 also include data or other information to be displayed, for instance, in the form of an overlay 204 to one or more image frames 202 displayed on the display window 200 of the output device 110. The overlay 204 may also be received from other sources, for instance, the overlay 204 may comprise data stored in the data store 320. In this instance, a user may input data 303 or instructions, for instance, through a remote control, into the receiver 104 for the overlay 204 to be retrieved from the data store 320 and displayed on the display window 200. By way of particular example, a user may input a command to the receiver 104 to display a channel guide or closed captioning as an overlay on the display window 200 through the remote control.

At step 404, a determination that an overlay 204 is to be displayed over a plurality of frames 202 is made, for instance, by the overlay detection module 304. This determination may be made based upon whether data pertaining to the overlay 204 has been received with the encoded input stream 301 or an instruction from a user pertaining to display of the overlay 204 has been received. For instance, the user may choose to display a PIP window showing content from a channel other than the channel to which the main window is tuned. In one embodiment, the overlay detection module 304 may detect the PIP window from the encoded input stream 301 and the input data 303.

At step 406, a determination as to whether the overlay 204 is opaque or translucent is made, for instance, by the overlay detection module 304. In response to the overlay 204 being translucent, the encoded input stream 301 is selectively decoded to generate full versions of the plurality of frames at step 414. In this regard, the portions of the frames 202 covered by the overlay 204 are decoded, for instance, by the decoder module 310 since those portions will still be visible through the translucent overlay 204.

At step 408, the location of the overlay 204 on the plurality of frames 202 is determined, for instance, by the overlay location determining module 306. Step 408 may be performed in response to a determination that the overlay 204 is opaque. According to an example, the frames 202 are generated as a plurality of macroblocks and the macroblocks covered by the overlay 204 are determined at step 408. As discussed below, the macroblocks covered by the overlay 204 may be discarded such that those macroblocks are not decoded during the decoding of the frames containing the overlay 204. In addition, at step 408, the size of the overlay 204 on the plurality of frames 202 may be determined, for instance, by the overlay location determining module 306. By way of example, coordinates of the macroblocks covered by the overlay 204 may be detected and the location and the size of the overlay 204 on the plurality of frames 202 may be calculated based on the coordinates of the macroblocks.

At step 410, a determination as to whether a frame 202 containing the overlay 204 is a frame type used for predicting for at least one of a future frame and a past frame is made, for instance, by the frame classification module 308. More particularly, for instance, the frame classification module 308 may determine whether the frame 202 comprises an I-frame, a P-frame, or a B-frame. I-frames and P-frames are used for predicting for at least one of a future frame and a past frame, whereas, B-frames are not used for such predictions.

At step 412, in response to a determination that the frame 202 is not a frame type used for predicting at least one of a future frame and a past frame, the encoded input stream 301 is selectively decoded, for instance, by the decoder module 310. More particularly, the decoder module 310 may selectively decode partial or full versions of the plurality of frames 202 containing overlays 204 based upon various characteristics of the overlays 204 and the frames 202.

In an embodiment, at step 412, the decoder module 310 decodes partial versions of the frames 202, that is, only those sections of the frames 202 that are not covered by the overlay 204. In this embodiment, the decoder module 310 may decode partial versions of the frames 202 when the frames 202 do not comprise frames of a frame type used for predicting for at least one of a future frame and a past frame and when the overlay 204 is opaque. The decoder module 310 may decode partial versions of the frames 202 by discarding the macroblocks that are covered by the overlay 204 and by decoding only the remaining macroblocks that are not covered by the overlay 204.

In addition, the overlay 204 and the decoded frames 202 may be mixed, for instance, by the mixer module 312 and outputted through the output module 314 for display in the output device 110.

However, at step 414, in response to a determination at step 410 that the frames 202 comprise frames of a frame type used for predicting for at least one of a future frame and a past frame or if the overlay 204 is translucent, the decoder module 310 may decode full versions of the frames 202. As such, the decoder module 310 may be implemented to selectively decode the encoded input stream to selectively generate partial versions of the frames 202 when possible to thereby reduce the amount of bandwidth required to decode the encoded input stream. Following step 414, the decoded frames 202 may be sent directly to the output module 314 or through the mixer module 312 and outputted through the output module 314 for display in the output device 110.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
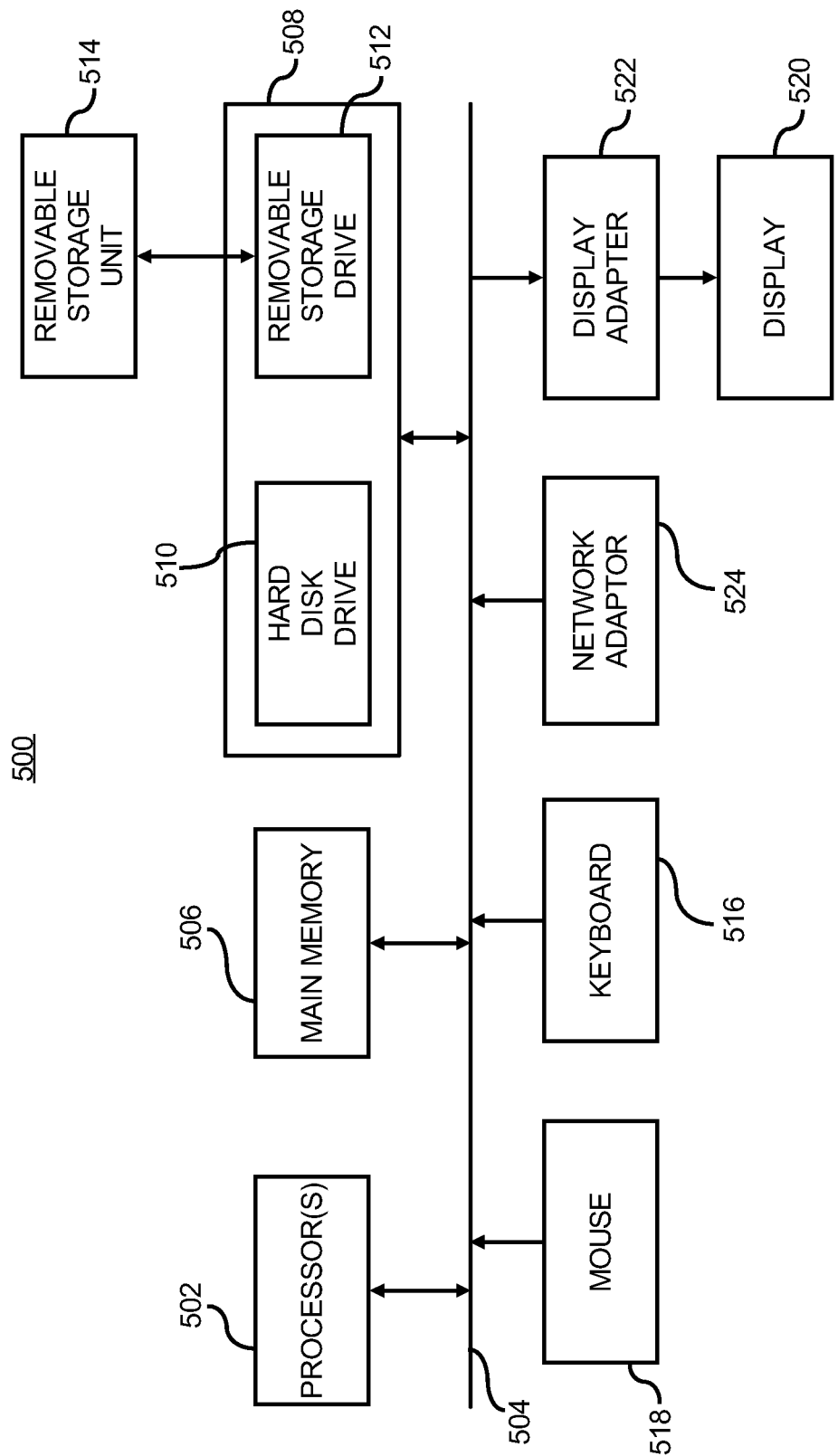
FIG. 5 shows a block diagram of a computer system that may be used as a platform for implementing or executing one or more of the processes depicted in FIG. 4, according to an embodiment of the present invention.

FIG. 5 illustrates a block diagram of a computing apparatus 500 configured to implement or execute one or more of the processes depicted in FIG. 4, according to an embodiment. It should be understood that the illustration of the computing apparatus 500 is a generalized illustration and that the computing apparatus 500 may include additional components and that some of the components described may be removed and/or modified without departing from a scope of the computing apparatus 500.

The computing apparatus 500 includes a processor 502 that may implement or execute some or all of the steps described in one or more of the processes depicted in FIG. 4. For example, the processor 502 is configured to receive an encoded input stream for display as a plurality of frames in a display window, to determine a location of an overlay on the plurality of frames, and to selectively decode the encoded input stream to selectively generate the plurality of frames based upon the location of the overlay on the plurality of frames. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for one or more of the processes depicted in FIG. 4 may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

Through implementation of the method and receiver disclosed herein, the amount of bandwidth required to decode an encoded input stream for display as a plurality of frames in a display window may substantially be reduced when an overlay is provided on the plurality of frames. More particularly, the method and receiver disclosed herein are configured to selectively decode the encoded input stream by decoding only those sections of the plurality of frames that are not covered by the overlay, thus reducing, for instance, the number of macroblocks of the frames to be decoded. The method and receiver disclosed herein may, however, partially decode the encoded input stream when certain conditions pertaining to the overlay and the frames are met.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method of selectively decoding an input stream, said method comprising:
   receiving an encoded input stream for display as a plurality of frames in a display window;
   determining, while receiving the encoded input stream, that an overlay is to be displayed over the plurality of frames;
   determining a location of the overlay on the plurality of frames;
   determining if the overlay is one of (i) an opaque overlay and (ii) a translucent overlay;
   selectively decoding the encoded input stream to selectively generate the plurality of frames based at least upon the location of the overlay on the plurality of frames, wherein selectively decoding includes generating partial versions of the plurality of frames if the overlay is the opaque overlay, and generating full versions of the plurality of frames if the overlay is the translucent overlay; and
   displaying the generated plurality of frames and the overlay.

2. The method according to claim 1, wherein selectively decoding the encoded input stream further comprises decoding only those sections of the plurality of frames that are not covered by the overlay.

3. The method according to claim 1, further comprising:
   determining that the overlay is to be displayed over the plurality of frames in the display window prior to determining the location of the overlay, wherein determining that the overlay is to be displayed further comprises determining whether the overlay is invoked to be displayed by a user.

4. The method according to claim 1, wherein each of the plurality of frames comprises a plurality of macroblocks, said method further comprising:
   discarding the plurality of macroblocks within the plurality of frames that are covered by the overlay while selectively decoding the encoded input stream for the plurality of frames.

5. The method according to claim 1, said method further comprising:
   determining whether one or more of the plurality of frames are frame types used for predicting at least one of a future frame and a past frame; and
   wherein selectively decoding the encoded input stream further comprises decoding the encoded input stream to generate full versions of the plurality of frames determined to be frame types used for predicting at least one of a future frame and a past frame.

6. The method according to claim 5, wherein selectively decoding the encoded input stream further comprises decoding the encoded input stream to generate partial versions of the plurality of frames in response to the plurality of frames comprising frame types that are not used for predicting at least one of a future frame and a past frame.

7. The method according to claim 1, wherein each of the plurality of frames comprises one of an I-frame, a P-frame, and a B-frame, and wherein selectively decoding the encoded input stream further comprises decoding the encoded input stream to generate full versions of the plurality of frames determined to be one of an I-frame and a P-frame.

8. The method according to claim 7, wherein selectively decoding the encoded input stream further comprises decoding the encoded input stream to generate partial versions of the plurality of frames determined to be a B-frame.

9. A receiver comprising:
   an input module configured to:
   receive an encoded input stream for display as a plurality of frames in a display window; and
   determine, while receiving the encoded input stream, that an overlay is to be displayed over the plurality of frames;
   an overlay detection module configured to determine if the overlay is one of (i) an opaque overlay and (ii) a translucent overlay;
   an overlay location determining module configured to determine a location of an overlay on the plurality of frames;
   a decoder configured to selectively decode the encoded input stream to selectively generate the plurality of frames based upon the location of the overlay on the plurality of frames, wherein selectively decoding includes generating partial versions of the plurality of frames if the overlay is the opaque overlay, and generating full versions of the plurality of frames if the overlay is the translucent overlay; and
   an output module configured to display the generated plurality of frames and the overlay.

10. The receiver according to claim 9, wherein the decoder is configured to selectively decode only those sections of the plurality of frames that are not covered by the overlay.

11. The receiver according to claim 9, wherein each of the plurality of frames comprises a plurality of macroblocks, and wherein the decoder is further configured to discard the plurality of macroblocks within the plurality of frames that are covered by the overlay while selectively decoding the encoded input stream for the plurality of frames.

12. The receiver according to claim 9, further comprising:
   a frame classification module configured to determine whether one or more of the plurality of frames are frame types used for predicting at least one of a future frame and a past frame; and
   wherein the decoder is further configured to decode the encoded input stream to generate full versions of the plurality of frames determined to be frame types used for predicting at least one of a future frame and a past frame.

13. The receiver according to claim 12, wherein the decoder is further configured to selectively decode the encoded input stream to generate partial versions of the plurality of frames in response to the plurality of frames comprising frame types that are not used for predicting at least one of a future frame and a past frame.

14. A non-transitory computer readable storage medium on which is embedded one or more computer programs, said one or more computer programs implementing a method of selectively decoding an input stream, said one or more computer programs comprising a set of instructions for:
- receiving an encoded input stream for display as a plurality of frames in a display window;
- determining, while receiving the encoded input stream, that an overlay is to be displayed over the plurality of frames and determining if the overlay is one of (i) an opaque overlay and (ii) a translucent overlay;
- determining a location of an overlay on the plurality of frames;
- selectively decoding the encoded input stream to selectively generate the plurality of frames based upon the location of the overlay on the plurality of frames, wherein selectively decoding includes generating partial versions of the plurality of frames if the overlay is the opaque overlay, and generating full versions of the plurality of frames if the overlay is the translucent overlay; and
- displaying the generated plurality of frames and the overlay.

15. The non-transitory computer readable storage medium according to claim 14, wherein selectively decoding the encoded input stream further comprises decoding only those sections of the plurality of frames that are not covered by the overlay.

* * * * *